(12) United States Patent
Henderson et al.

(10) Patent No.: US 6,226,720 B1
(45) Date of Patent: May 1, 2001

(54) METHOD FOR OPTIMALLY CONFIGURING MEMORY IN A MIXED INTERLEAVE SYSTEM

(75) Inventors: Daniel James Henderson, Pflugerville; James Otto Nicholson, Austin; John Hughes Rost, Pflugerville, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,505

(22) Filed: Dec. 11, 1998

(51) Int. Cl.⁷ ..................................................... G06F 12/06
(52) U.S. Cl. ............................................................ 711/157
(58) Field of Search .................................... 711/105, 127, 711/157, 170, 171, 172, 173

(56) References Cited

U.S. PATENT DOCUMENTS

| | | | |
|---|---|---|---|
| 4,293,910 | 10/1981 | Flusche et al. | 364/200 |
| 4,924,375 | 5/1990 | Fung et al. | 364/200 |
| 5,051,889 | 9/1991 | Fung et al. | 364/200 |
| 5,269,010 | 12/1993 | MacDonald | 395/425 |
| 5,301,292 | 4/1994 | Hilton et al. | 395/425 |
| 5,412,788 | 5/1995 | Collins et al. | 395/425 |
| 5,619,471 | 4/1997 | Nunziata | 365/230.03 |
| 5,652,861 | 7/1997 | Mayo et al. | 395/484 |
| 5,668,974 | 9/1997 | Grassi et al. | 711/157 |
| 5,737,572 | 4/1998 | Nunziata | 395/484 |
| 5,809,555 | * 9/1998 | Hobson | 711/172 |
| 5,960,462 | * 9/1999 | Solomon et al. | 711/172 |

* cited by examiner

Primary Examiner—Kevin L. Ellis
(74) Attorney, Agent, or Firm—Leslie A. VanLeeuwen; Felsman, Bradley, Vaden, Gunter & Dillon, LLP

(57) ABSTRACT

Memory bank pairs are sorted utilizing variables determined by a scoring criteria. The scores for the variables are based on the number of memory blocks in a memory bank that are filled; the total number of memory bank pairs that are identically populated (same set of blocks per bank) and the number of memory bank pairs that either match or are close to a standard interleave value. Sort schemes are determined by the values of each variable. A first sort scheme is attempted and after the sort scheme is complete, if all possible configurable banks are not configured, the banks are marked un-configured and another sort scheme is tried. Each sort scheme, utilizing a maximum of four schemes, is attempted until a method is found that configures all possible configurable bank pairs. Sorting is done for up to three levels, i.e., all bank pairs are sorted according to a first value, then all bank pairs with equal values are sorted according to a second value. Then the resulting matching bank pairs are sorted according to the third value. This method reduces the time required to determine a minimum and sufficient number of interleave registers required to configure all possible memory configurations in a given mixed interleave memory.

12 Claims, 3 Drawing Sheets

METHOD FOR OPTIMALLY CONFIGURING MEMORY IN A MIXED INTERLEAVE SYSTEM

BACKGROUND OF THE INVENTION

1. Technical Field

The present invention generally relates to data processing systems and more particularly to data processing systems with a memory system incorporating a plurality of memory banks. The present invention more particularly relates to a memory system wherein there are multiple sizes of memory banks.

2. Description of the Related Art

Memory systems are well known in the art and such systems are used in many data processing applications. Memory systems provide program and operating data to associated central processing units to enable the central processing units to execute program instructions. In applications where a large amount of memory space is required, such as in mainframe or mini-computer applications, memory systems may include multiple memory banks. The memory banks may be formed with dynamic random access memories because of their extremely high memory density.

In order to access such memories, central processing units utilize various addressing and retrieval schemes to improve memory access time. One such scheme is interleaved memory. Memory interleaving is a process of organizing Random Access Memory ("RAM") to reduce wait states. Typically, memory is organized in rows of memory chips with equal sizes of memory banks (a memory section convenient for a Central Processing Unit to address) and logical addresses are assigned to memory banks comprising a memory system. The logical addresses correspond to physical addresses of memory locations in different banks. In most large computer systems, system memory is divided into individual banks that may be independently accessed.

Interleaving is generally performed at startup. Firmware, in the data processing system, may utilize a limited set of tables that contains pre-set memory configuration or a configuration algorithm that interleaves memory at startup. Interleaving is usually expressed in terms of the number of units interleaved together. For example, a system described as having 8-way interleaving (interleaving factor of eight) may be divided into 8 units with interleaved addresses. Addresses that may be assigned to locations in a first unit may be 0, 8, 16, 24, etc., locations in a second unit may have 1, 9, 17, 25, etc., locations in a third unit may have 2, 10, 18, 26, etc. and so forth.

Usually each of the memory banks are accessible independently of the other memory banks. Interleaving permits accessing of data in different memory blocks at approximately the same time thus, an interleaved memory system may provide data faster than an equivalent non-interleaved memory.

Time required to provide data from memory is usually referred to as "latency." One method to speed up a data processing system is to reduce latency. Maximizing the number of levels of memory interleaving can reduce latency, which increases data throughput in the system, and speed up data retrieval.

More interleave levels reduce memory conflicts when the same memory block is being accessed in separate memory operations. Generally, in a non-interleaved system, the conflicting operations are queued and serviced one at a time.

In an ideal system, all banks of memory would be interleaved together. However the design of many systems requires that banks be of the same size before they may be interleaved. Thus, if a system had 16 banks of memory, 8 of one size and eight of another, it would be common that the first eight would be interleaved together (8-way interleaving) and the next eight would be interleaved as 8-way, but separately from the first group of eight.

Interleaving is generally performed on banks in multiples of two; that is 1-way (no-way or high interleaving), 2-way, 4-way, 8-way, 16-way, etc. Thus a system with 16 possible banks, but only 12 populated (four banks are empty), could only have the first 8 banks interleaved as 8-way and the next 4 as 4-way. Some systems split the memory even further, where the memory banks are composed of one or more fixed-size blocks of memory.

Consider a system with 4 memory cards: Card 0 has 4 32 MB blocks on 4 banks, (a 128 MB card); Card 1 has 8 32 MB blocks on 4 banks. (a 256 MB card); Card 2 has 16 32 MB blocks on 4 banks (a 512 MB card) and Card 3 has 32 32 MB blocks on 4 banks, (a 1024 MB card). Visually one could look at the blocks and banks of memory as shown in Table 1.

TABLE 1

|      |         |         |         |         |
| ---- | ------- | ------- | ------- | ------- |
|      | - - - - | - - - - | - - - - | x x x x |
|      | - - - - | - - - - | - - - - | x x x x |
|      | - - - - | - - - - | - - - - | x x x x |
|      | - - - - | - - - - | - - - - | x x x x |
|      | - - - - | - - - - | x x x x | x x x x |
|      | - - - - | - - - - | x x x x | x x x x |
|      | - - - - | x x x x | x x x x | x x x x |
|      | x x x x | x x x x | x x x x | x x x x |
| Bank | 0 1 2 3 | 4 5 6 7 | 8 9 a b | c d e f |
| Card | 0       | 1       | 2       | 3       |

An x indicates that a 32MB block is occupied, an a indicates the block is empty.

Ideally, one would interleave memory so that all blocks are configured and that the highest possible interleaving is effected. One way to interleave the banks in Table 1 could be as shown in Table 2.

TABLE 2

|      |          |          |          |          |
| ---- | -------- | -------- | -------- | -------- |
|      | - - - -  | - - - -  | - - - -  | 4b4b4b4b |
|      | - - - -  | - - - -  | - - - -  | 4b4b4b4b |
|      | - - - -  | - - - -  | - - - -  | 4b4b4b4b |
|      | - - - -  | - - - -  | - - - -  | 4b4b4b4b |
|      | - - - -  | - - - -  | 8a8a8a8a | 8a8a8a8a |
|      | - - - -  | - - - -  | 8a8a8a8a | 8a8a8a8a |
|      | - - - -  | 4a4a4a4a | 8a8a8a8a | 8a8a8a8a |
|      | 16161616 | 16161616 | 16161616 | 16161616 |
| Bank | 0 1 2 3  | 4 5 6 7  | 8 9 a b  | c d e f  |
| Card | 0        | 1        | 2        | 3        |

The number 16 indicates that the blocks shown are 16-way interleaved, 8a indicates that all the blocks with 8a are interleaved together in an 8-way interleave. 4a indicates that all blocks with 4a are interleaved together in a 4-way interleave, 4b indicates that all the blocks with 4b are interleaved, but it is a different interleave from 4a. (The blocks of 4a and 4b are not interleaved together.)

In typical hardware implementations, there are not an unlimited number of interleave groupings that can be taken, however. Actual interleaving must be mapped to a memory address. Typically part of the memory address is used to select logically defined blocks of memory. Each logical block is programmed with an "interleave register" set which selects, based on additional address bits, the physical bank that the block resides on. Additional address bits select the actual memory word to be accessed. A logical block table and interleave registers must be programmed for the actual memory configuration present. This is usually done by firmware during system initialization at power on.

Typically the memory controller used in the larger systems have register sets which allow for two sets of 2-way interleaving, 1 set of 4-way, 1 set of 8-way and one set of 16-way. If any of the sets for 2-way is not used for 2-way, they can be used for 1-way or high interleaving. The example above would necessarily have to be accomplished differently. Table 3 below indicates a possible solution.

TABLE 3

|      |          |          |          |          |
|------|----------|----------|----------|----------|
|      | - - - -  | - - - -  | - - - -  | 4a4a4a4a |
|      | - - - -  | - - - -  | - - - -  | 4a4a4a4a |
|      | - - - -  | - - - -  | - - - -  | 4a4a4a4a |
|      | - - - -  | - - - -  | - - - -  | 4a4a4a4a |
|      | - - - -  | - - - -  | 8a8a8a8a | 8a8a8a8a |
|      | - - - -  | - - - -  | 8a8a8a8a | 8a8a8a8a |
|      | - - - -  | 2a2a2b2b | 8a8a8a8a | 8a8a8a8a |
|      | 16161616 | 16161616 | 16161616 | 16161616 |
| Bank | 0 1 2 3  | 4 5 6 7  | 8 9 a b  | c d e f  |
| Card | 0        | 1        | 2        | 3        |

The 2-way register sets are used since there isn't a second set of 4-way.

Now, however, if the second card has only 2 banks, an attempt to interleave within the constraints would run in to problems. For example in Table 4:

TABLE 4

|      |          |          |          |          |
|------|----------|----------|----------|----------|
|      | - - - -  | - - - -  | - - - -  | 4a4a4a4a |
|      | - - - -  | - - - -  | - - - -  | 4a4a4a4a |
|      | - - - -  | - - - -  | - - - -  | 4a4a4a4a |
|      | - - - -  | - - - -  | - - - -  | 4a4a4a4a |
|      | - - - -  | - - - -  | 8a8a8a8a | 8a8a8a8a |
|      | - - - -  | ? ? - -  | 8a8a8a8a | 8a8a8a8a |
|      | 2a2a2b2b | ? ? - -  | 8a8a8a8a | 8a8a8a8a |
| Bank | 0 1 2 3  | 4 5 6 7  | 8 9 a b  | a d e f  |
| Card | 0        | 1        | 2        | 3        |

The ?? indicate blocks that could not be configured.

There are many different ways to configure the interleaving, but with the constraints given, it is not possible to configure every block.

In the memory systems being considered, all interleaving, except 2-way (and high interleaving), require that a given block in a row of an odd numbered bank must be interleaved with the corresponding block of the next odd numbered bank. In other words, banks are paired such that banks 0 and 1 are in one pair, 2 and 3 in another, and so on. Memory is also constricted such that the even bank in a card must be populated with memory before an odd bank.

Because of this pairing, for 16, 8 and 4 way interleaving, only bank pairs need to be considered. For two way, however, any single row may be paired with another. Hence in an algorithm attempting to sort banks to determine ordering, it would be useful to make the adjustment that when 2-way is being tried for a block, the pair to the block may come from the next available column and need not be adjacent to the first pair being tried.

In this approach, just ordering the banks one time, would require 8! (eight factorial) sorts to try all possible ways of ordering in a 16 bank system. This would take a prohibitively long time if implemented in firmware. The problem would be greatly compounded if attempting to re-order all possible combinations after each pass.

It would therefore be desirable to provide a method that would configure interleaving so all card combinations, that would configure all the memory, will be handled. It would also be desirable that the method would perform the interleave without searching all possible memory ordering. It would further be desirable that the method would accomplish interleaving without relying on pre-loaded tables.

SUMMARY OF THE INVENTION

It is therefore one object of the present invention to provide a method of configuring all memory card combinations that can be configured utilizing a maximum of four sort schemes.

It is another object of the present invention to provide a method of configuring the maximum number of memory cards without doing an exhaustive search of all possible combinations.

It is yet another object of the present invention to provide a method of configuring the maximum number of memory cards without relying on pre-loaded tables.

The foregoing objects are achieved as is now described. Memory bank pairs are sorted utilizing variables determined by a scoring criteria. The scores for the variables are based on the number of memory blocks in a memory bank that are filled; the total number of memory bank pairs that are identically populated (same set of blocks per bank) and the number of memory bank pairs that either match or are close to a standard interleave value. Sort schemes are determined by the values of each variable. A first sort scheme is attempted and after the sort scheme is complete, if all possible configurable banks are not configured, the banks are marked un-configured and another sort scheme is tried. Each sort scheme, utilizing a maximum of four schemes, is attempted until a method is found that configures all possible configurable bank pairs. Sorting is done for up to three levels, i.e., all bank pairs are sorted according to a first value, then all bank pairs with equal values are sorted according to a second value. Then the resulting matching bank pairs are sorted according to the third value. This method reduces the time required to determine a minimum and sufficient number of interleave registers required to configure all possible memory configurations in a given mixed interleave memory.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
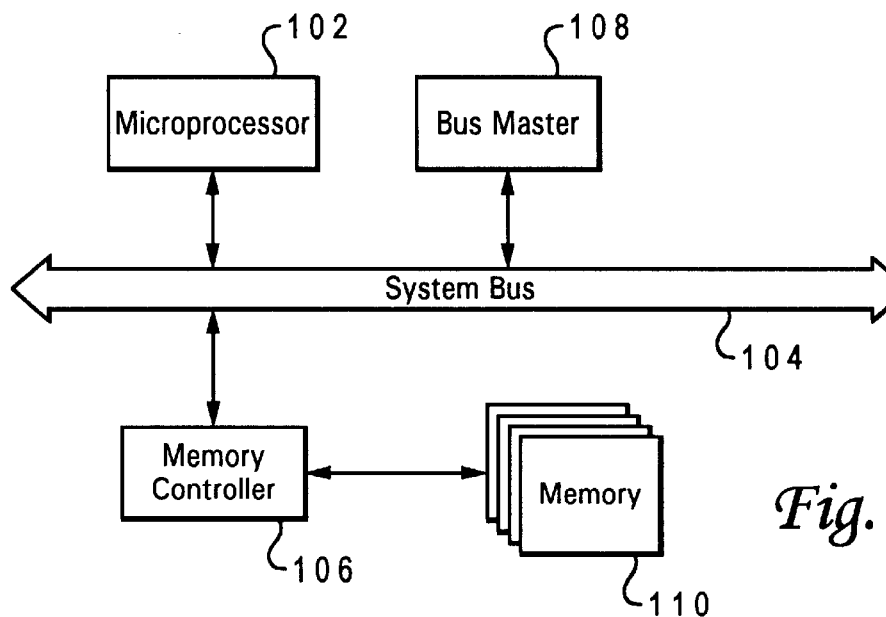
FIG. 1 depicts a general block diagram of an exemplary data processing system in which a preferred embodiment of the present invention may be implemented.

With reference now to the figures, and in particular with reference to FIG. 1, a general block diagram of a data processing system utilizing a preferred embodiment of the present invention, is depicted. Data processing system 100, as shown, comprises microprocessor (CPU) 102, bus master 108 (only one shown though it is well known in the art that there is generally more than one bus master), memory controller 106 and RAM memory 110. All components are bi-directionally coupled to system bus 104 and in this exemplary embodiment, system bus 104 includes an address bus, a data bus and a control bus, as is well known in the art. System bus 104 is bi-directionally coupled to memory controller 108 and RAM memory 110 so that bus master 108 may send data read/write requests through memory controller 106.

Memory controller 106 controls accesses to RAM memory 110. Memory controller 106 sends address and control signals to RAM memory 110 when receiving an access request. RAM memory 110 responds by transmitting data to system bus 104 or data is written into locations in RAM memory 110. Those skilled in the art will appreciate that the block diagram of FIG. 1 is simplified to illustrate only those functional elements of interest in describing the present invention and other functional elements, such as an I/O bus, PCI bus, etc., can also be interconnected with depicted elements via system bus 104.

Figure 1A:
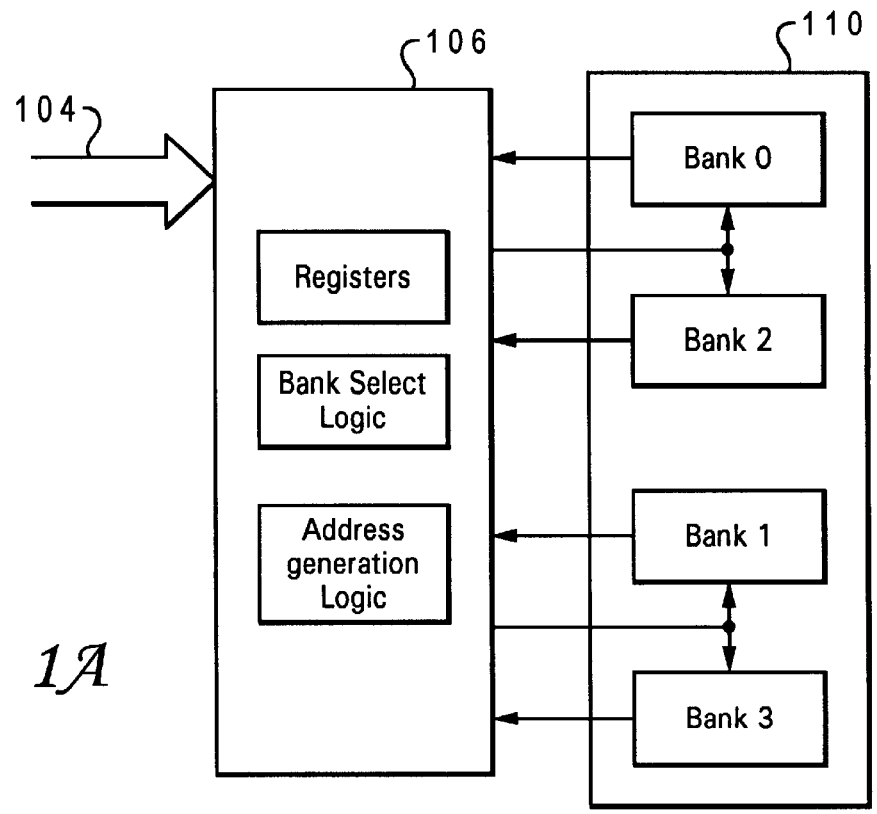
FIG. 1A illustrates interconnections between memory controller 104 and RAM memory 110 by which various memory accesses requested by bus master 108 of FIG. 1 are accomplished.

Referring now to FIG. 1A, interconnections between memory controller 106 and RAM memory 110 by which various memory accesses requested by bus master 108 of FIG. 1 are accomplished, are illustrated. RAM memory 110, in this embodiment, includes four banks of memory: Bank 0, Bank 1, Bank 2 and Bank 3. Those skilled in the art will understand that more banks or fewer banks of memory may be used and would simply require changing various aspects of the embodiment such as the width of various control signal lines, number of registers, and so on. Each bank may be implemented with multiple memory devices ("chips") typically dynamic random access memory ("DRAM") chips thus, "populating" the banks of memory.

Each of Banks 0, 1, 2 or 3 may be populated or unpopulated to provide various desired RAM memory 110 configurations. When Bank 0 and Bank 1 are both populated utilizing the same memory capacity, memory controller 106 may operate on both banks in an interleave manner. Memory controller 106 will write or retrieve every other data word from alternating banks in an interleaved pair. If Bank 2 and Bank 3 are populated with DRAM chips of the same size, memory controller 106 may operate upon each bank in an interleaved manner. However, if the paired banks are not populated with equal memory capacity, then memory controller 106 will operate on equal size blocks in each memory bank in an interleaved manner. For example, consider a memory system with two memory banks, each with a capacity of four blocks. If the first bank has two blocks populated and the second has three blocks populated, the first two blocks of each bank would be interleaved together. The third block in the second memory bank would not be interleaved.

At initialization of the data processing system 100, microprocessor 102 determines the size of RAM memory 110 banks and the population of each bank. This procedure is well known in the art and will not be further described here. Size (population) of the banks is then stored in registers in memory controller 106. Banks are then sorted to determine ordering.

To produce an ordering, some criteria is needed to determine which banks to place where. Two variables are created, scoring on a bank pair basis, looking at how many blocks are in a bank pair and how many bank pairs are alike:

a) A_Score—is a value such that there is a unique score for each possible configuration of bank pairs. All of the bank pairs with both banks filled have a higher score than any with one bank filled. Within this constraint, the highest score is given to the configurations with the most number of blocks. One way to compute this is to let A_Score= Number of blocks in the first bank. Add to A_Score the maximum (fully populated) number of blocks in a bank if the second bank in the pair has any blocks filled.

b) Nmatches is the total number of bank pairs that are identically populated with memory blocks. (Practically computed for any given bank pair as the number of bank pairs with the same A_Score as computed for the bank.)

Utilizing the above variables, a single sort of banks may be performed, in an iterative fashion, for bank pairs not yet chosen in the sort.

Figure 2:
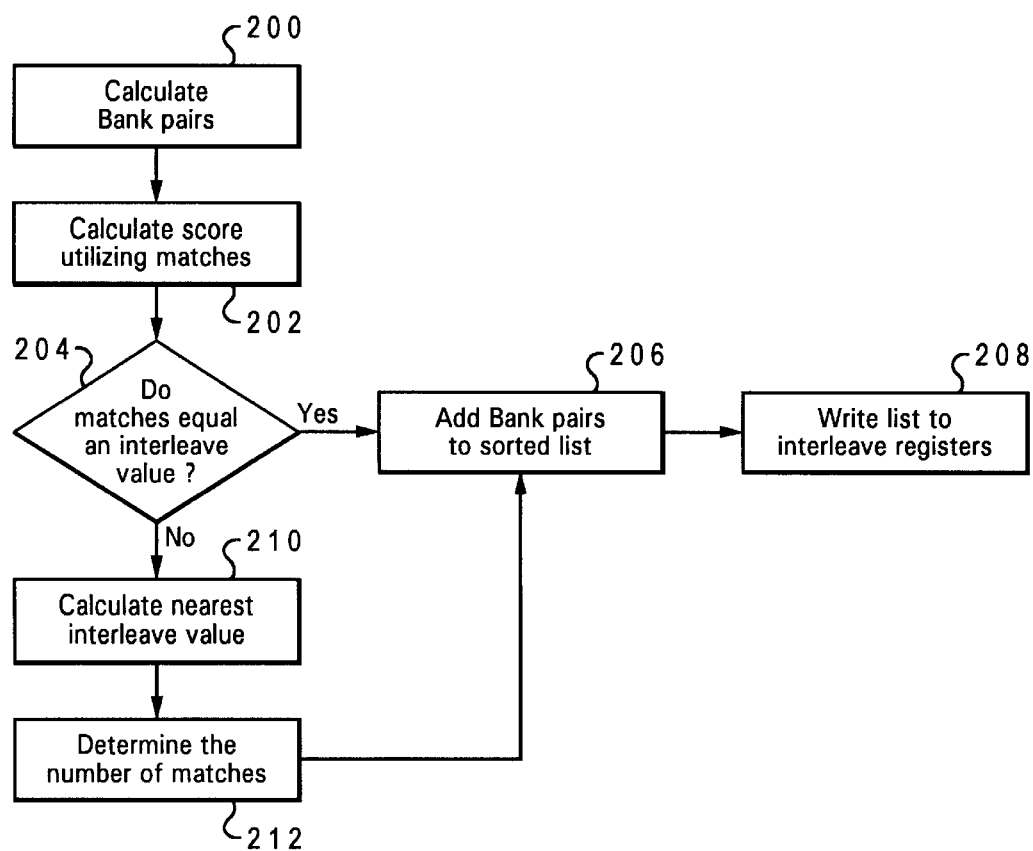
FIG. 2 is a high-level flow diagram depicting a process for performing an single sort of memory banks in accordance with a preferred embodiment of the present invention; an FIG. 3 depicts a high-level flow diagram of a method for efficiently and optimally configuring memory in a mixed interleave system in accordance with the present invention.

Referring to FIG. 2, a process for performing a single sort of memory banks in accordance with a preferred embodiment of the present invention, is depicted. The process begins with step 200, which depicts calculating the greatest number of matches of bank pairs. The process continues with step 202 which illustrates calculating the highest score (A_Score) with that number of matches. The process then passes to step 204, which depicts a determination of whether the number of matches is exactly equal to an interleave value (2-way, 4-way, 8-way, etc.). If so the process next passes to step 206, which illustrates taking the bank pairs so found and add them to a list of sorted bank pairs. If the number does not exactly match an interleave value, the process instead passes to step 210, which depicts the logic calculating the next closest interleave value to that number (e.g. if there were 6 matches, and 4 way interleave were found, pick 4 way interleave). The process next proceeds to step 212, which illustrates the logic determining the number of matches. The process continues to step 206 and adds the bank pairs to the sorted list. The process then passes to step 208, which depicts writing the sorted list to interleave registers. This single sort method configures many possible combinations. However, the sort does not configure every possibility.

It is possible to use a small number of different sorts (no more than four) and get all possible configurations for a system and the memory cards supported on the system. The general approach of the present invention is to sort bank pairs by one of four sorts for a first pass. The four sort types are shown in Table 5 below and, as shown, utilize up to three levels in a sorting scheme.

TABLE 5

| Sort Type | Primary Var. | Secondary Var | Tertiary Var. |
| --- | --- | --- | --- |
| MATCH_A | Nmatches | A_Score | none needed |
| A_MATCH | A_Score | Nmatches | none needed |
| MATCH_B | Nmatches | B_Score | none needed |
| Even_A | Even_or_Odd (Nmatches) | A_Score | Nmatches |

After each pass, banks with blocks not populated would be re-ordered using the same sort criteria. Another group of blocks would then be configured with the algorithm until all the blocks possible are configured.

The variables in the table are defined as follows: A_Score and Nmatches are as defined above. The third variable B_Score, has a value such that there is a unique score for each possible configuration of bank pairs. If there are no blocks in the bank pair, the score is lowest. Beyond that, bank pairs with both banks filled have a higher score than any with one bank filled. Within this constraint, the highest score is given to the configurations with the least number of blocks.

One way to compute B_Score is to let B_Score=A high number—actual number of blocks in the first bank. Add to B_Score the number of blocks in a second bank if the second bank in the pair has any blocks filled. If no banks are filled in either bank, B_Score=0. The "high number" utilized must be sufficiently large that B_Score will be greater than 0 if any blocks are filled Even_or_Odd primary variable is a sort such that all banks with Nmatches (bank pairs identically populated) being Even are sorted first followed by Nmatches being Odd. This is a binary sort which puts the banks with Even matches first.

Sorting at different levels means that all the bank pairs are sorted according to the primary variable indicated. All bank pairs which have equal values according to that sort, are sorted according to the secondary variable. All bank pairs which have an equal value for the first and second sorts are sorted according to a tertiary variable.

Figure 3:
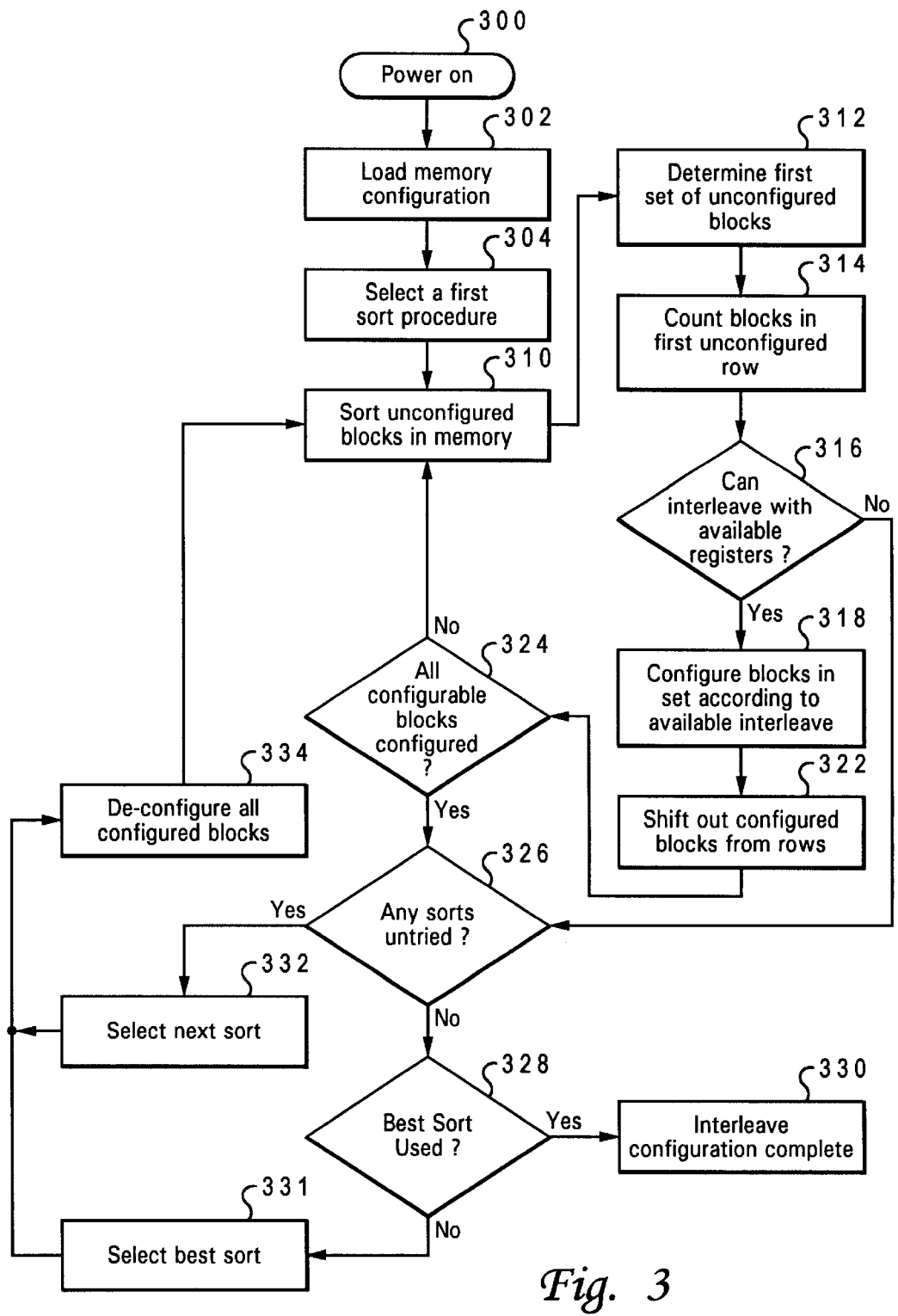

Referring now to FIG. 3, a high-level flow diagram of a method for efficiently and optimally configuring memory in a mixed interleave system in accordance with the present invention, is depicted. The process begins with step 300, which depicts a data processing system being powered on. The process next passes to step 302 which illustrates firmware loading the initial memory configuration. Memory configuration is established in a table which lists the blocks of banks that are populated. Effectively, an interleave table is formed without computing values that indicate which blocks are configured with which interleaving scheme (utilizing interleaving registers).

The process passes to step 304 which depicts the process selecting a sort procedure. Within this step, the process determines whether one of four sort procedures will be utilized in a first sort. As described above, in table 5, there are four sorts that the procedure may choose from to begin configuring: MATCH_A, A_MATCH, MATCH_B and Even_A sort procedure. After choosing a first sort procedure, the process proceeds to step 310, which depicts the process calculating variables for the chosen sort procedure and beginning to sort unconfigured blocks in target memory banks.

The process then passes to step 312, which depicts logic determining the first set of unconfigured blocks. A set may consist of blocks in one or several rows. The set is selected by examining the blocks in a first row starting with the first block in the sort and selecting all blocks that may be interleaved together. The next row above the first row is examined and if all blocks in banks configured in the first row are populated, the blocks of this next row are added to the set. This procedure continues until an unpopulated block is encountered above a block in a row already added to the set.

The process next passes to step 314, which illustrates counting the blocks in the first row of target memory blocks. The process continues to step 316, which depicts a determination of whether the previously counted blocks (a subset) may be interleaved with available registers (2-way, 4-way, 8-way, etc.). If the blocks may not be interleaved, the process proceeds to step 326, which illustrates a determination of whether all sort procedures have been attempted.

If the set or sub-set of blocks may be interleaved with available registers, the process proceeds instead to step 318, which depicts configuring blocks in the set or sub-set according to available interleave. The process next passes to step 322, which illustrates logic shifting the configured blocks out of rows (provides that only unconfigured blocks are available for consideration in steps 310 and 312). The process next passes to step 324, which depicts a determination of whether or not all configurable blocks are configured. If there are configurable blocks remaining, the process proceeds to step 310 and the cycle of determining unconfigured blocks is repeated.

If the determination in step 324 is made that all configurable blocks have been configured, the process instead passes to step 326, which illustrates a determination of whether any sorts are untried. If all sorts have been attempted, the process passes to step 328, which depicts a determination of whether or not the best sort has been utilized. A best sort is determined by comparing the results of each sort and the sort with the most interleaved memory is deemed the best sort. If the best sort has been utilized, the process continues to step 330 which illustrates the interleave configuration and the sort process as complete. If the best sort has not been utilized, the process proceeds instead to step 331 which depicts the process selecting the best sort and configuring the memory utilizing the best sort.

If all sorts have not been attempted, the process passes instead from step 326 to step 332, which illustrates the process selecting the next untried interleave scheme in order. The process then passes to step 334, which illustrates de-configuring all configured blocks. The process continues to step 310 and the cycle is repeated.

This method is useful in many data processing system designs and provides an optimal solution for other memory controllers that organize memory by banks and blocks. After the method completes, either all the memory is configured or some memory may be left unconfigured. By utilizing the four sort procedures as described, an optimum configuration is achieved within a short period of time.

Additionally, the method allows for determining a best scheme for interleaving registers for different memory configurations even when all blocks are configured. This is accomplished by attempting all possible sorts, as previously discussed, utilizing the three variables and scoring the sorts by a "goodness measure". For example, a system with 8 blocks possible per 16 banks may be scored:

goodness=$n$blocks at 16_way*16+$n$blocks at 8_way*8+$n$blocks at 4_way*4+$n$blocks at 2_way*2− $n$blocks not configured*4096*MAX_COLS*16*2.

(4096 was computed as the maximum number of blocks at 16_way*16*2)

Utilizing the "goodness measure," the sort with the highest score should be used. This scoring gives maximum weight to a scheme that leaves the least number of banks disabled and which gives some preference to having the most banks with the highest interleaves. In this scheme it has been found that a B_Score sort followed by a Nmatches sort is useful to cause certain configurations to be best interleaved.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include:

nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for interleaving memory banks in a data processing system, comprising:
    computing predefined variables including:
        within a pair of memory banks, determining a first variable by
            calculating a first number of fully populated memory blocks in a first bank of the pair of memory banks,
            calculating a second number of fully populated memory blocks in a second bank of the pair of memory banks, and
            adding the second number to the first number;
        calculating a second variable comprising a number of pairs of memory banks which are identically populated with memory blocks; and
        within the pair of memory banks, calculating a third variable by
            subtracting a total number of memory blocks in the first memory bank from an arbitrary number selected to cause the third variable to be greater than zero if any of the memory blocks within the first memory bank are populated, and
            adding a total number of memory blocks in the second memory bank to the arbitrary number if any of the memory blocks are populated;
    determining an execution order for a defined set of sort procedures, wherein the defined set is limited to a number of sort procedures sufficient to produce an optimal interleave scheme;
    effecting a first sort procedure utilizing a predetermined combination of the predefined variables; and
    responsive to successful completion of a sort procedure within the execution order, mapping a resulting interleave scheme to a plurality of interleave registers.

2. The method of claim 1, further comprising:
    responsive to the outcome of a prior sort procedure within the execution order, beginning an nth sort procedure within the execution order utilizing an nth predetermined combination of the predefined variables, wherein n does not exceed four.

3. The method of claim 1, further comprising:
    determining a minimum number of the plurality of interleave registers required to configure all possible memory configurations.

4. The method of claim 1, wherein the step of effecting the first sort procedure utilizing a predetermined combination of the predefined variables further comprises:
    a) configuring matching memory blocks within the memory banks;
    b) determining whether all memory blocks are configured;
    c) determining whether there are sufficient interleave registers available; and
    d) de-configuring the configured blocks if all memory blocks are not configured.

5. The method of claim 4, further comprising:
    determining unconfigured memory blocks in selected memory banks;
    configuring selected unconfigured memory blocks;
    determining whether all unconfigured memory blocks are configured;
    if all unconfigured memory blocks are not configured, determining whether all sort procedures have been utilized; and
    de-configuring the memory blocks if all sort procedures have not been utilized.

6. The method of claim 1, wherein the step of determining an execution order for a defined set of sort procedures, wherein the defined set is limited to a number of sort procedures sufficient to produce an optimal interleave scheme, further comprises:
    selecting one of the plurality of sort procedures; and
    ordering remaining procedures in a non-specific order.

7. A computer program product within a computer usable medium for interleaving memory banks in a data processing system, comprising:
    instructions within the computer usable medium for computing predefined variables, the instructions including instructions for:
        within a pair of memory banks, determining a first variable by
            calculating a first number of fully populated memory blocks in a first bank of the pair of memory banks,
            calculating a second number of fully populated memory blocks in a second bank of the pair of memory banks, and
            adding the second number to the first number;
        calculating a second variable comprising a number of pairs of memory banks which are identically populated with memory blocks; and
        within the pair of memory banks, calculating a third variable by
            subtracting a total number of memory blocks in the first memory bank from an arbitrary number selected to cause the third variable to be greater than zero if any of the memory blocks within the first memory bank are populated, and
            adding a total number of memory blocks in the second memory bank to the arbitrary number if any of the memory blocks are populated;
    instructions within the computer usable medium for determining an execution order for a defined set of sort procedures, wherein the defined set is limited to a number of sort procedures sufficient to produce an optimal interleave scheme;
    instructions within the computer usable medium for effecting a first sort procedure utilizing a predetermined combination of the predefined variables; and
    instructions within the computer usable medium, responsive to successful completion of a sort procedure within the execution order, for mapping a resulting interleave scheme to a plurality of interleave registers.

8. The computer program product of claim 7, further comprising:
    instructions within the computer usable medium, responsive to the outcome of a prior sort procedure within said execution order, for beginning an nth sort procedure within the execution order utilizing an nth predetermined combination of the predefined variables, wherein n does not exceed four.

9. The program product of claim 7, further comprising:

instructions within the computer usable medium for determining a minimum number of the plurality of interleave registers required to configure all possible memory configurations.

10. The program product of claim 7, wherein the instructions for effecting the first sort procedure utilizing a predetermined combination of the predefined variables further comprise:

a) instructions within the computer usable medium for configuring matching memory blocks within the memory banks;

b) instructions within the computer usable medium for determining whether all memory blocks are configured;

c) instructions within the computer usable medium for determining whether there are sufficient interleave registers available; and d) instructions within the computer usable medium for de-configuring the configured memory blocks if all memory blocks are not configured.

11. The program product of claim 10, further comprising:

instructions within the computer usable medium for determining unconfigured memory blocks in selected memory banks;

instructions within the computer usable medium for configuring selected unconfigured memory blocks;

instructions within the computer usable medium for determining whether all unconfigured memory blocks are configured;

instructions within the computer usable medium, if all unconfigured memory blocks are not configured, for determining whether all sort procedures have been utilized; and instructions within the computer usable medium for de-configuring the memory blocks if all sort procedures have not been used.

12. The program product of claim 7, wherein the instructions within the computer usable medium for determining an execution order for a defined set of sort procedures, wherein the defined set is limited to a number of sort procedures sufficient to produce an optimal interleave scheme determining an execution order for a plurality of sort procedures, further comprise;

instructions within the computer usable medium for selecting one of the plurality of sort procedures; and instructions within the computer usable medium for ordering remaining the procedures in a non-specific order.

* * * * *

UNITED STATES PATENT AND TRADEMARK OFFICE
CERTIFICATE OF CORRECTION

PATENT NO. : 6,226,720 B1
DATED : May 1, 2001
INVENTOR(S) : Henderson et al.

Page 1 of 1

It is certified that error appears in the above-identified patent and that said Letters Patent is hereby corrected as shown below:

Column 3, Table 4,
Line 6, please insert as follows: -- - - - -  - - - -   8a8a8a8a   8a8a8a8a --
Line 9, correct as follows: "a d e f" to -- c d e f --

Column 4,
Line 64, please correct the word "an" to -- and --

Signed and Sealed this

Nineteenth Day of March, 2002

Attest:

JAMES E. ROGAN
Director of the United States Patent and Trademark Office

Attesting Officer